United States Patent [19]
Armenia et al.

[11] Patent Number: 5,931,184
[45] Date of Patent: Aug. 3, 1999

[54] SAFETY HOSE FOR DELIVERING WATER TO AN APPLIANCE

[76] Inventors: John G. Armenia, P.O. Box 716; Alfred L. Calciano, 3342 W. Gulf Drive, both of Sanibel Island, Fla. 33957

[21] Appl. No.: 08/872,234

[22] Filed: Jun. 10, 1997

[51] Int. Cl.$^6$ .............................. F16L 9/18; F16L 55/16
[52] U.S. Cl. .............................. 137/312; 73/46; 73/49.1; 138/114; 285/13; 285/123.1
[58] Field of Search ................. 137/312; 73/46, 73/49.1; 138/103, 104, 113, 114; 141/88; 68/207, 208; 285/13, 123.1

[56] References Cited

U.S. PATENT DOCUMENTS

| | | | |
|---|---|---|---|
| 313,393 | 3/1885 | Westinghouse, Jr. | 285/123.1 |
| 1,466,592 | 8/1923 | King | 285/123.1 |
| 2,838,074 | 6/1958 | Lauck | 285/123.1 |
| 4,062,376 | 12/1977 | McGrath | 137/312 |
| 4,149,568 | 4/1979 | Kuntz et al. | 138/114 |
| 4,274,549 | 6/1981 | Germain | 138/114 |
| 4,445,332 | 5/1984 | Thies et al. | 285/123.1 |
| 4,886,305 | 12/1989 | Martin | 138/113 |
| 4,922,971 | 5/1990 | Grantham | 138/113 |
| 4,930,549 | 6/1990 | Renner | 138/113 |
| 5,156,190 | 10/1992 | Staley, Jr. | 137/312 |
| 5,285,744 | 2/1994 | Grantham et al. | 138/113 |
| 5,497,810 | 3/1996 | Berger et al. | 138/113 |
| 5,529,098 | 6/1996 | Bravo | 137/312 |

FOREIGN PATENT DOCUMENTS

| | | | |
|---|---|---|---|
| 2210756 | 9/1972 | Germany | 138/114 |

*Primary Examiner*—George L. Walton
*Attorney, Agent, or Firm*—William E. Noonan

[57] ABSTRACT

A safety hose apparatus is provided for delivering water from a standard threaded hose bib to an appliance. The apparatus includes a first end fitting that has a first pipe. A first threaded connector is rotatably attached to the first pipe for communicably connecting the first pipe to the hose bib. A second end fitting includes a second pipe and a second threaded connector is rotatably connected to the second pipe for communicably connecting the second pipe to a standard threaded appliance inlet. An elongate outer hose segment extends continuously between the first and second fittings and includes a first end interengaged with the first end fitting and spaced apart from the first connector to fully expose the first connector. A second end is interengaged with the second end fitting and spaced apart from the second connector to fully expose the second connector. An elongate inner hose segment extends through the outer hose segment and communicably interconnects the first and second pipes. The inner and outer hose segments have an interior space formed therebetween. The apparatus transmits water from the hose bib to the inlet of the appliance and the interior chamber captures water leaking escaping through a rupture in the inner hose segment.

16 Claims, 2 Drawing Sheets

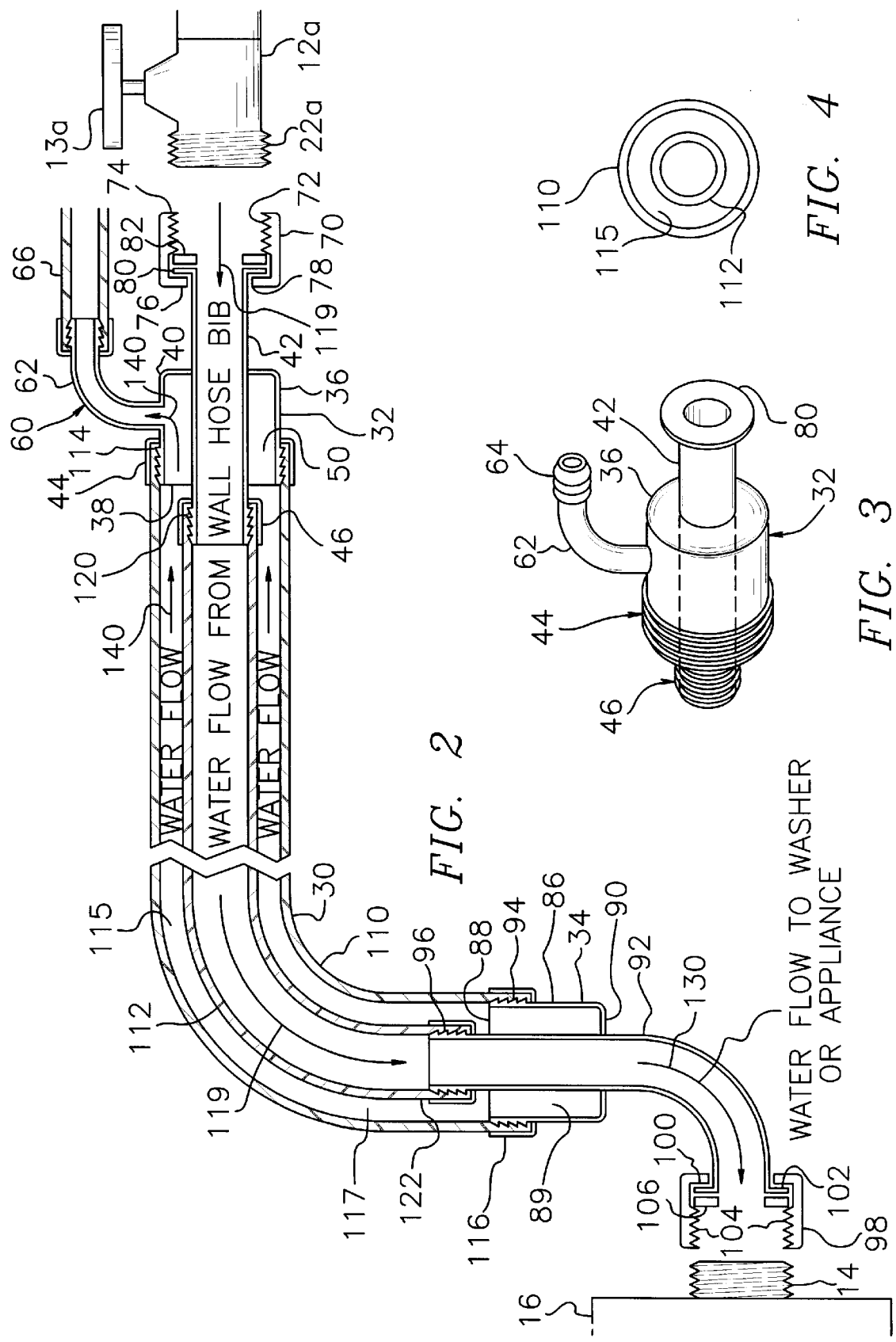

SAFETY HOSE FOR DELIVERING WATER TO AN APPLIANCE

FIELD OF THE INVENTION

This invention relates to a safety hose for delivering water from a standard hose bib to an appliance that utilizes the water. More particularly, this invention relates to a safety hose for washing machines, dishwashers, other appliances and plumbing fixtures.

BACKGROUND OF THE INVENTION

Various types of appliances, including washing machines and dishwashers as well as assorted plumbing fixtures, such as toilets and sinks, must be interconnected through a hose to a source of water. Conventional water hoses, which are normally composed of rubber or plastic, tend to wear and break down over time. Deterioration is caused, for example, by bending of the hose and the repeated passage of water through the hose. Hot water hoses are particularly susceptible to wear because of the stresses caused by repeated changes in temperature. Hose life is also affected by the water quality, water pressure, geographic locale and frequency of use. As the hose deteriorates, ruptures are likely to occur. Eventually, the hose may rupture or burst, which can result in flooding and serious water damage to the room or building in which the appliance is located, as well as items located therein. Aggravating and extremely expensive repairs may be necessitated.

Various techniques and procedures have been employed to combat leaks and ruptures in water hoses. Certain of these devices employ sophisticated electronic sensors that detect leakage in the hose and shut off the supply of water to the hose by closing a valve proximate the hose bib. These products are invariably expensive and virtually impossible for most homeowners to install. They have not significantly reduced the problem of ruptured appliance hoses.

Renner, U.S. Pat. No. 4,930,549 discloses a technique for installing a pair of protective sleeves respectively on the hot and cold water hoses of a washing machine. A drainage hose is interconnected between the sleeves for conducting water that leaks from either of the hoses to a standard drain line. This procedure is complicated, time consuming, labor intensive and wholly impractical. The protective sleeve must be cut in various locations and installed in several segments. Up to 20 fittings and clamps must be used and these components cannot be tested until the protective sleeve is fully installed on the hose. Accordingly, the system operates unreliably. If the hose segments or fittings are not properly and precisely fitted, potentially damaging leaks are still very likely to occur. Moreover, the protective sleeves must be wrapped completely about and secured to both the hose bib spout and the inlet of the washing machine. And the outer sleeve can be installed only after the inner hose is already interconnected between the hose bib and the appliance inlet. As a result, the Renner technique is a time consuming and tedious procedure that usually requires the expertise of an expensive professional plumber.

SUMMARY OF INVENTION

It is therefore an object of the present invention to provide an improved, yet greatly simplified safety hose for appliances and plumbing fixtures that utilize water.

It is a further object of this invention to provide a universal safety hose that comprises a fully factory assembled product, which may be installed quickly and conveniently on a wide variety of appliances and plumbing fixtures, including but not limited to washing machines and dishwashers.

It is a further object of this invention to provide a safety hose that employs a relatively simple, uncomplicated and inexpensive construction including no clamps, only a single continuous length of outer hose and only two universal fittings.

It is a further object of this invention to provide a safety hose that operates effectively and reliably to prevent water leaks and resulting damage.

It is a further object of this invention to provide a safety hose that is conveniently assembled and pressure tested at the factory so that installation is facilitated and consistently reliable and relatively fail-safe operation is achieved.

It is a further object of this invention to provide a safety hose employing a protective outer hose that is never under water pressure and which thereby resists rupturing.

It is a further object of this invention to provide a safety hose that employs an outer sleeve or hose which is not attached directly to the hose bib or the appliance inlet so that installation of the apparatus is facilitated considerably.

It is a further object of this invention to provide a safety hose that is easily and inexpensively installed, even by homeowners and lay persons having no plumbing expertise.

This invention results from a realization that a pre-assembled, factory tested safety hose may be constructed simply and inexpensively by employing a pair of end fittings that carry respective rotatable threaded connectors and by utilizing a pair of inner and outer hoses that are permanently interconnected between the end fittings such that the outer hose extends continuously between the end fittings and the ends of the outer hose are spaced apart from respective rotatable connectors. This permits the safety hose to be quickly and conveniently installed by simply screwing the threaded connectors onto the hose bib and the appliance or plumbing fixture inlet, respectively.

This invention features a safety hose apparatus for delivering water from a standard hose bib to an appliance. The apparatus includes a first end fitting, which has means defining a first pipe. A first threaded connector is rotatably attached to the first pipe for communicably connecting the first pipe to the hose bib. A second end fitting includes means defining a second pipe. There is a second threaded connector rotatably attached to the second pipe for communicably connecting the second pipe to a standard threaded inlet of the appliance. An elongate outer hose extends continuously between the first and second fittings and includes a first end interengaged with the first end fitting and spaced apart from the first connector means to fully expose the first connector means. A second end of the outer hose is interengaged with the second end fitting and is spaced apart from the second connector means to fully expose the second connector means. An elongate inner hose extends through the outer hose and communicably interconnects the first and second pipes. The inner and outer hoses have an interior space formed therebetween. The apparatus transmits water from the hose bib to the inlet of the appliance and the interior space receives water escaping through a rupture in the inner hose.

In a preferred embodiment, the first end fitting includes means defining a first plug disposed about and attached to the first pipe and a second plug disposed about and attached to the second pipe. The first end of the water hose may be interengaged with the first plug and the second end of the outer hose may be interengaged with the second plug. The first end plug may include a first, generally cylindrical element having an open end that communicates with the outer hose and a distal wall fixed to the first pipe and through which the first pipe extends. The second plug may include a second cylindrical element having an open end that communicates with the outer hose and a distal end wall attached to the second pipe and through which said second pipe extends. Each cylindrical element and associated pipe may define an annular space that communicates with the interior space between the inner and outer hoses. The first and second end plugs may define respective ends of the interior space.

Each threaded connector may include a generally cylindrical component having an open forward end, a rearward end wall attached to the cylindrical element and including a central opening through which a respective one of the first and second pipes extends. Threads may be formed on the inner circumferential surface of the cylindrical element. Each pipe may include a radial flange disposed inside a respective cylindrical element and interengaging the end wall to rotatably mount the connector on a respective pipe.

Drain conduit means may be attached directly to a respective one of the end fittings and in communication with the interior space for discharging liquid from the interior space into a standard appliance drain pipe. The drain conduit means may be attached directly to the cylindrical element of the first plug and may communicate with the annular space associated with that cylindrical element for discharging liquid from the interior space into a standard appliance drain pipe. The drain conduit means may include a permanent outlet port formed through the cylindrical element and a drain hose communicably interconnecting the outlet port and the standard drain pipe. The permanent outlet port may be formed in the cylindrical element at a location between the first end of the outer hose and the first threaded connector means.

DETAILED DESCRIPTION OF PREFERRED EMBODIMENTS

Other objects, features and advantages will occur from the following description of preferred embodiments and the accompanying drawings, in which:

FIG. 2 is an elevated, partly cross sectional view of the safety hose apparatus;

FIG. 3 is a perspective view of the first end fitting located proximate the standard hose bib; and FIG. 4 is a cross sectional view of the inner and outer hose segments.

Figure 1:
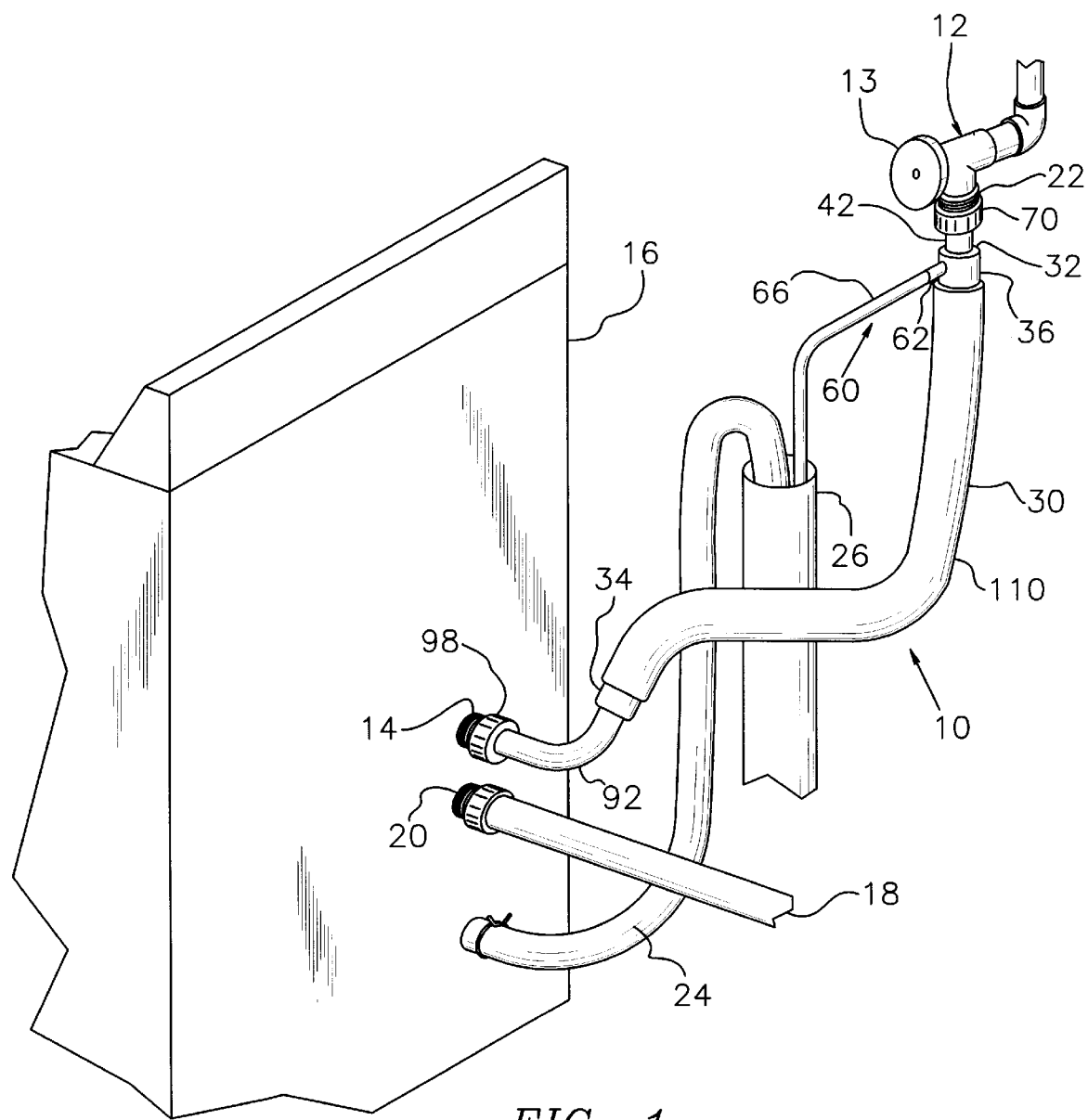
FIG. 1 is a perspective view of a washing machine utilizing the safety hose apparatus of this invention.

There is shown in FIG. 1 a safety hose apparatus 10 for delivering water from a standard hose bib 12 to the inlet 14 of a washing machine 16. Hose bib 12 represents the usual hot water source for the washing machine. An analogous safety hose apparatus may be utilized for the cold water line. However, it is particularly preferred that apparatus 10 be employed for the hot water line because that line is subject to greater stresses due to the relatively high temperature of water usually delivered through the hose. For simplicity, apparatus 10 is shown herein attached only between the hot water bib 12 and washing machine 16. A standard cold water conduit 18 is secured to cold water inlet 20 in a conventional manner. Although a washing machine is depicted in this embodiment it should be understood that apparatus 10 may be employed with a wide variety of other appliances that are connected to a source of water. As used herein "appliance" includes all types of machines and also includes plumbing fixtures such as toilets and sinks.

Hose bib 12 includes a threaded spout 22. Washing machine Inlet 14 is likewise externally threaded. The hose bib includes a valve handle 13, which rotates about a horizontal axis. The valve handle is opened to provide water to the washing machine in a known manner. A standard washing machine drain hose 24 discharges water from washing machine 16 and empties that water into a conventional drain pipe 26.

In FIG. 2, the hose bib is altered slightly in a known manner. Specifically, hose bib 12a includes a threaded spout 22a that extends in an axially horizontal manner. Valve handle 13a is mounted such that it rotates about a vertical axis. Although positioned somewhat differently, both hose bibs 12 and 12a operate in an analogous manner. In fact, the safety hose of this invention may be employed with all known types of hose bibs.

As best shown in FIG. 1, hose apparatus 10 includes an elongate hose structure 30 interconnected between a first end fitting 32 and an opposite second end fitting 34. The first and second fittings 32 and 34 may be composed of brass or some other type of corrosion-resistant metal. Alternatively, various types of molded plastics and other synthetic components may be utilized to form the fittings. As best shown in FIGS. 2 and 3, first end fitting 32 includes a generally cylindrical plug 36 having an open end 38 and an wall 40 formed at the opposite end. A first elongate pipe 42 extends centrally through cylindrical plug 36. An inner end of the pipe is located beyond open end 38 of plug 36. Pipe 42 passes fully through plug 36 and through and beyond wall 40. The pipe is joined to the end wall by welding or other appropriate means. A plurality of barbs or protuberances 44 is formed about the outer circumferential surface of plug 36 proximate open end 38. Similarly, a plurality of barbs 46 are formed about the outer circumference of pipe 42 proximate the inner end of that pipe. Pipe element 42 is fastened to cylindrical plug 36 such that an interior annular space 50 is formed between the pipe element and the cylindrical plug.

A drain conduit 60, FIG. 1, is attached directly to cylindrical plug 36 of first end fitting 32. As illustrated in FIGS. 2 and 3, drain conduit 60 includes a permanent outlet port 62 that is attached to and extends transversely from cylindrical plug element 36. Outlet port 62 includes a generally tubular segment that communicates with annular space 50 of fitting 32. The distal end of tubular outlet port 62 includes circumferential barbs 64. An elongate drain hose 66, FIGS. 1 and 3, is compression fit or otherwise attached to outlet 62 such that hose 66 grips barbs 64. The drain hose interconnects port 62, and thereby fitting 32, with drain pipe 26, in the manner best shown in FIG. 1. The function of this drain line is described more fully below.

A standard threaded female cylindrical connector 70 is rotatably attached to the distal end of first pipe 42. Connector 70 preferably comprises a generally cylindrical, rotatable nozzle fitting of the type employed by garden hoses and analogous types of hoses. The interior circumference of connector 80 includes a helical thread 72. The connector 70 includes an open end 74 and an opposite wall 76 having a central opening 78 formed therethrough. Opening 78 receives first pipe 42 and is sufficiently wide such that the pipe is axially rotatable therein. The distal end of the pipe includes an annular flange 80, FIGS. 2 and 3. Flange 80 engages the inside surface of connector wall 76 and attaches the connector rotatably to pipe 42. An annular washer 82, FIG. 2, is disposed within connector 70 and engages flange 80. Washer 82 helps to minimize leakage from the connector 70. Connector 70 is fastened to the hose bib by simply screwing the connector onto the bib such that threads 72 interengage the threads on spout 22a. Analogously, connector 70 is secured to hose bib 12 in FIG. 1 by screwing the connector onto threaded spout 22 of bib 12.

As shown in FIG. 2, second end fitting 34 similarly includes a generally cylindrical second plug element 86 having an open first end 88 and an opposite wall 90. Fitting 34 also includes a second pipe 92 that extends centrally through plug element 86. More particularly, pipe 92 extends through wall 90 of element 86 and is secured thereto by welding or other appropriate means. Pipe 92 has a generally L-shaped configuration. The inner end of the pipe is located beyond the inner, open end 88 of plug element 86. Likewise, the distal or L-shaped end of the pipe element extends beyond wall 90. A first set of barbed connectors 94 is formed circumferentially about plug 86 proximate open end 88. Likewise, a set of connecting barbs 96 is formed circumferentially about the inner end of pipe 92.

A cylindrical female connector 98 is rotatably attached to the distal end of pipe 92. Similar to the previous end fitting, pipe 92 extends through an opening in an end wall 100 of threaded connector 98. An annular flange 102 is formed about the distal end of the pipe. Flange 102 interengages wall 100 of connector 98 to rotatably mount the connector onto the pipe. Threads 104 are formed about the interior circumference of connector 98. The connector is attached to threaded appliance inlet 14 by interengaging connector threads 104 with the circumferential threads of inlet 14 and screwing connector 98 onto inlet 14 in a known manner. Once again, a washer 106 is disposed within connector 98 to reduce leaking from connector 98.

Hose structure 30 includes an outer hose segment 110, FIGS. 1, 2 and 4, and an inner hose segment 112 that extends generally centrally through outer hose segment 110. More particularly, outer hose segment 110 extends continuously between fittings 32 and 34 and includes a first end 114 that is interengaged with first plug element 36 and a second end 116 that is interengaged with plug element 86. Preferably, end 114 is compression fit onto plug element 36 such that the hose segment interengages barbs 44. This holds the outer hose segment securely onto first fitting 32. Likewise, end 116 is compression fit onto plug element 86 such that the hose segment interengages barbs 94 carried by element 86. Various alternative means of attachment may also be employed. Hose end 114 is spaced apart from rotatable connector 70 such that connector 70 remains fully exposed. Similarly, hose end 116 is spaced apart from rotatable connector 98 to fully expose that connector as well. As a result, both the connectors 70 and 98 freely rotate without any interference or hindrance from the outer hose segment 110. This is an important feature of the invention and permits apparatus 10 to be quickly and conveniently secured both to the hose bib and to the appliance inlet in a manner that will be described more fully below.

Inner hose segment 112 extends through outer hose 110 and communicably interconnects pipe 42 of first end fitting 32 with pipe 92 of second end fitting 34. More particularly, a first end 120 of hose segment 112 is compression fit onto the inner end of pipe 42 such that hose segment 112 securely grips barbs 46 of pipe 42. Likewise, end 122 of hose segment 112 is compression fit onto the inner end of pipe 92. The inner hose securely grips barbs 96 to fasten the pipe 92 to the inner hose segment 112. When connected in this manner, inner hose segment 112 communicably joins pipes 42 and 92. As a result, water is able to flow from threaded connector 70 to threaded connector 98. A generally annular interior space 115 is formed between the hoses. Annular interior space 115 communicates with annular space 50 of cylindrical end plug 36 and annular space 89 of plug 86. This overall space serves as a chamber 117 to receive water that leaks through any ruptures in the inner hose segment 112. This operation is described more fully below.

The inner and outer hose segment may be composed of various flexible, water resistant materials including rubber, neoprene and a wide variety of alternative natural and plastic materials. Preferably, the entire apparatus 10 is mass produced or otherwise fully assembled and tested at the factory. The end fittings and connectors may be molded or formed by other known processes. The inner and outer hose segments 110 and 112, as well as the drainage hose 66 are then permanently attached to the respective fittings, preferably by appropriate known compression fitting techniques. Only five points of attachment are required for the hoses. This facilitates the manufacturing procedure considerably and significantly reduces the cost of manufacture.

Apparatus 10 is installed quickly and conveniently. First, the homeowner or other installer turns off the valve at hose bib 12, 12a. The old hose interconnecting the bib and the appliance is then removed and discarded. Next, fully assembled apparatus 10 is installed. Threaded connector 70 is screwed onto threaded sprout 22 or 22a. The opposite threaded connector 98 is similarly screwed onto threaded appliance inlet 14. Finally, drain hose 66 is inserted into drain pipe 26. Apparatus 10 is now fully installed and ready for use.

To operate appliance 16, valve 13, 13a is opened. Each time the washing machine or other appliance is used, water is delivered through the apparatus 10 from the hose bib to the appliance inlet 14. Specifically, water is introduced through connector 70 into inner pipe 42. The water travels, in the direction of arrows 119, through communicably interconnected inner pipe 42, inner hose segment 112 and inner pipe 92 of second end fitting 34. The water then exits pipe 92, as indicated by arrow 130, and is introduced through connector 98 into inlet 14 of appliance 16. During normal operation, the appliance uses the water and eventually discharges the water through drain line 24, FIG. 1, into drain pipe 26.

In the event that a crack, break, leak or other rupture occurs in hose 112, water enters the space 115 between inner hose segment 112 and outer hose segment 110. Plug elements 36 and 86 serve effectively as plugs or stoppers at the end of outer hose segment 110 and retain the water within the chamber 117. As indicated by arrows 140 in FIG. 2, this water is discharged through outlet 62 into drain hose 66. The drain hose conducts the water into drain pipe 26, FIG. 1. As a result, the leaking water is captured by the outer hose segment 110 and released into the standard drain pipe. Potentially expensive damage to the room, building and/or furniture is thereby avoided.

In alternative embodiments, the permanent outlet 60 and drain hose 66 may be omitted. In such versions, the device preferably employs some type of indicator, which warns the homeowner that the inner hose has burst or otherwise ruptured. A visual or audio indicator may be employed. In such embodiments, when the inner hose bursts or ruptures, the outer hose prevents water from leaking into the room. Water continues to be delivered to and used by the appliance. The use of some type of warning indicator is desirable in such cases because eventually the outer hose may deteriorate and leak. It should be noted that a warning indicator may also be employed when a drain conduit is used, as in the above described manner.

In still other embodiments, the plugs may be eliminated and the inner and outer hose segments may be secured to the respective pipes. Also, drain conduits may be connected to both end fittings 32 and 34, or simply fitting 34 alone.

Accordingly, the present invention features a very reliable, easy to install and inexpensively manufactured safety hose that is suitable for use on washing machines, dishwashers and all types of appliances and plumbing fixtures utilizing water. Only two universal fittings are required and these fittings may be pressure tested at the factory. Installation is quick, simple and inexpensive. Clamps and multiple sleeve segments are eliminated. Reliable protection is provided against potentially catastrophic hose ruptures. Because each end of the outer hose is fastened to a respective fitting at a point that fully exposes the rotatable threaded connector, the entire product may be installed by virtually anyone in only a few moments. The prior art, which requires that the outer sleeve be attached directly to and cover the threaded connectors, does not permit such an installation. Accordingly, the known art teaches a fairly intricate and costly installation procedure for covering an existing hose. In contrast, the present invention discloses a fully assembled, factory tested product that is installed quickly, simply and inexpensively onto the appliance.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A safety hose apparatus for delivering water from a threaded spout of a standard hose bib to a standard threaded appliance inlet, said apparatus comprising:

a continuous outer hose;

an inner hose extending through said outer hose;

a first end fitting, which includes a first pipe communicably connected proximate one end thereof to a first end of said inner hose, a first threaded connector being rotatably attached to said first pipe proximate the opposite end thereof and threadably engaged with the spout of the hose bib to communicably connect said first pipe and said inner hose to said hose bib; and a second end fitting that includes a second pipe communicably connected proximate one end thereof to a second end of said inner hose, a second threaded connector being rotatably attached to said second pipe proximate the other end thereof and threadably engaged with the appliance inlet to communicably interconnect said inner hose and said second pipe to the appliance inlet, whereby water from said hose bib is transmitted through said first pipe, said inner hose and said second pipe to the appliance inlet; and at least a portion of said first fitting defining a first closure that is attached to a first end of said outer hose and at least a portion of said second fitting defining a second closure that is attached to a second end of said outer hose to retain, within said outer hose, water leaking through a rupture in said inner hose, said first threaded connector being peripherally exposed by said first end of said outer hose sufficiently to permit unhindered rotation of said first threaded connector about said first pipe so that said first connector may be threadably engaged with and disengaged from the spout, and said second threaded connector being peripherally exposed by said second end of said outer hose sufficiently to permit unhindered rotation of said second threaded connector relative to said second pipe so that said second connector may be threadably engaged with and disengaged from the appliance inlet.

2. The apparatus of claim 1 in which each said threaded connector includes a generally cylindrical component having an open forward end, a rearward end wall attached to said cylindrical element and including a central opening through which a respective one of said first and second pipes extends, and threads formed on the inner circumferential surface of said cylindrical element, said respective pipe including a radial flange disposed inside said cylindrical element and interengaging said end wall to rotatably mount said connector on said respective pipe.

3. The apparatus of claim 1 in which said first and second plugs define respective ends of said interior space.

4. The apparatus of claim 1 further including drain conduit means attached directly to a respective one of said end fittings for discharging liquid from between said hoses into a standard appliance drain pipe.

5. The apparatus of claim 1 in which said first closure is connected to and generally surrounds said first pipe, and said second closure is connected to and generally surrounds said second pipe.

6. The apparatus of claim 5 in which said first closure includes a generally cylindrical first plug and said second closure includes a generally cylindrical second plug.

7. The apparatus of claim 6 in which said first end of said outer hose segment is interengaged with said first plug and said second end of said outer hose segment is interengaged with said second plug.

8. The apparatus of claim 7 in which said first plug includes a first generally cylindrical element having an open end that communicates with said outer hose segment and a distal end wall fixed to said first pipe and through which said first pipe extends, and in which said second plug includes a second cylindrical element having an open end that communicates with said outer hose segment and a distal end wall attached to said second pipe and through which said second pipe extends, each cylindrical element and associated pipe defining an annular space that communicates with said interior space between said inner and outer hose segments.

9. The apparatus of claim 8 further including drain conduit means attached directly to said cylindrical element of said first plug and communicating with said annular space associated with said first cylindrical element for discharging liquid from said interior space into a standard appliance drain pipe.

10. The apparatus of claim 9 in which said drain conduit means include a permanent outlet port formed through said cylindrical element and a drain hose communicably interconnecting said outlet port and the standard drain pipe.

11. The apparatus of claim 10 in which said permanent outlet port is formed in said cylindrical element at a location between said first end of said outer hose segment and said first threaded connector means.

12. The apparatus of claim 1 in which said first closure is defined by a segment of said first pipe and said second closure is defined a segment of said second pipe, said first end of said outer hose being connected directly to said first pipe and spaced apart from said first end of said inner hose, said second end of said outer hose being connected directly to said second pipe and spaced apart from said second end of said inner hose.

13. A safety hose apparatus for delivering water from a threaded spout of a standard hose bib to a standard threaded appliance inlet, said apparatus comprising:

a continuous outer hose;

an inner hose extending through said outer hose;

a first end fitting, which includes a first pipe communicably connected proximate one end thereof to a first end of said inner hose, a first threaded connector being rotatably attached to said first pipe proximate the opposite end thereof and threadably engaged with the spout of the hose bib to communicably connect said first pipe and said inner hose to the hose bib;

a second end fitting that includes a second pipe communicably connected proximate one end thereof to a second end of said inner hose, a second threaded connector being rotatably attached to said second pipe proximate the other end thereof and threadably engaged with the appliance inlet to communicably interconnect said inner hose and said second pipe to the appliance inlet, whereby water from the hose bib is transmitted through said first pipe, said inner hose and said second pipe to the appliance inlet;

at least a portion of said first fitting defining a first closure that is attached to a first end of said outer hose and at least a portion of said second fitting defining a second closure that is attached to a second end of said outer hose to retain, within said outer hose, water leaking through a rupture in said inner hose, said first threaded connector being peripherally exposed by said first end of said outer hose sufficiently to permit unhindered rotation of said threaded first threaded connector relative to said first pipe so that said first connector may be threadably engaged with and disengaged from the spout, and said second threaded connector being peripherally exposed by said second end of said outer hose sufficiently to permit unhindered rotation of said second threaded connector relative to said second pipe so that said second connector may be threadably engaged with and disengaged from the appliance inlet; and drain conduit means attached to at least one of said closures for discharging leaking water from between said hoses into a standard appliance drainpipe.

14. The apparatus of claim 13 in which said first closure is connected to and generally surrounds said first pipe, and said second closure is connected to and generally surrounds said second pipe.

15. The apparatus of claim 13 in which said first closure is defined by a segment of said first pipe and said second closure is defined a segment of said second pipe, said first end of said outer hose being connected directly to said first pipe and spaced apart from said first end of said inner hose, said second end of said outer hose being connected directly to said second pipe and spaced apart from said second end of said inner hose.

16. The apparatus of claim 14 in which said first closure includes a generally cylindrical first plug and said second closure includes a generally cylindrical second plug.

* * * * *